(No Model.)

J. B. HANLON.
ANTIFRICTION BEARING.

No. 547,167. Patented Oct. 1, 1895.

WITNESSES:
J. J. Laass
C. E. Tomlinson

INVENTOR
James B. Hanlon
By E. Laass
his ATTORNEY

United States Patent Office.

JAMES B. HANLON, OF LITTLE FALLS, NEW YORK.

ANTIFRICTION-BEARING.

SPECIFICATION forming part of Letters Patent No. 547,167, dated October 1, 1895.

Application filed February 21, 1895. Serial No. 539,208. (No model.)

*To all whom it may concern:*

Be it known that I, JAMES B. HANLON, of Little Falls, in the county of Herkimer, in the State of New York, have invented new and useful Improvements in Antifriction-Bearings, of which the following, taken in connection with the accompanying drawings, is a full, clear, and exact description.

This invention relates to the class of antifriction-bearings which have rollers interposed between the axle and its journal-box.

The object of my invention is to provide the antifriction-rollers with broader and more substantial bearing-surfaces, which shall be so shaped as to allow the rollers to freely slide thereon with a minimum degree of friction and traverse the series of bearings through the medium of intervening rocker-bearings, which shall be absolutely free from friction; and to that end my invention consists of the antifriction-rollers formed with longitudinal grooves of segmental shape in cross-section and meeting each other with intervening V-shaped longitudinal edges, in combination with the axle and journal box, both formed with longitudinal segmental ridges meeting with intervening V-shaped grooves corresponding, respectively, to the aforesaid grooves and edges of the rollers, as hereinafter more fully described, and specifically set forth in the claim.

Figure 1:
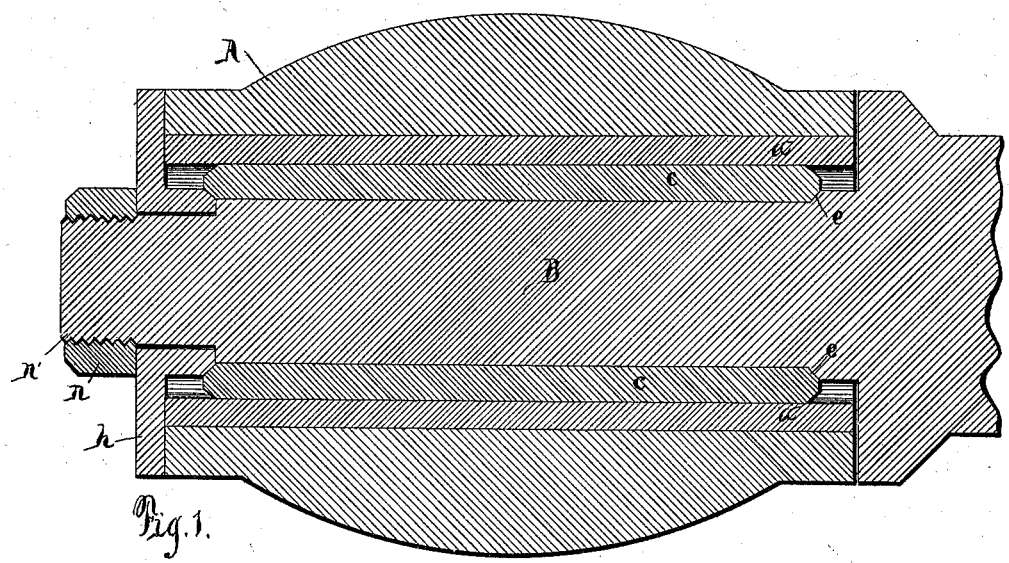
Figure 2:
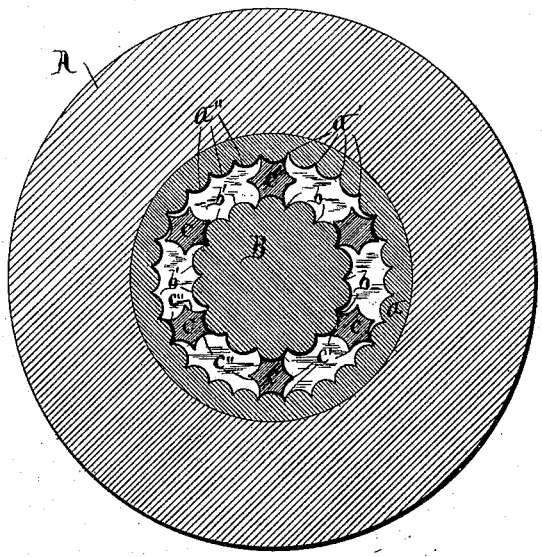

In the annexed drawings the improved bearing is shown applied to the hub of a vehicle-wheel, Figure 1 of which is a longitudinal section of a wheel-hub and vehicle-axle embodying my improved antifriction-bearing, and Fig. 2 is a transverse section of the same.

Similar letters of reference indicate corresponding parts.

A represents the wheel-hub, and *a* the journal-box. When the hub is formed of metal, said journal-box may be formed integral with the hub; but in a wooden hub the metallic journal-box *a* is secured in the bore of the hub in the usual manner or as shown in the annexed drawings. The inner surface of this box is formed with longitudinal V-shaped grooves *a'* and intervening rounded ribs *a''* of segmental shape in cross-section.

B represents the journal of a vehicle-axle, which I form with corresponding longitudinal V-shaped grooves *b* and intervening rounded ribs *b'*. Interposed between said journal-box and axle are a plurality of rollers *c c*, formed with longitudinal grooves *c''*, which are segmental-shaped in cross-section and meet with intervening longitudinal V-shaped or sharp-edged ridges *c'*, said grooves *c''* and ridges *c'* corresponding, respectively, to the longitudinal ribs and grooves of the axle and journal-box. During the revolution of the wheel the aforesaid rollers are caused to travel step by step around the journal by the successive engagement of the aforesaid tongues or ribs on the rollers with the grooves in the journal and journal-box, and in said step-by-step movement the rollers slide with their grooved portions on the ribbed portions of the axle and journal-box, and receive thereby substantial bearings with a minimum degree of friction, and in passing from bearings to bearings the rollers rock on their sharp-edged ridges, which are absolutely free from friction.

Although my improved roller-bearing is adapted more especially for wheel-hubs of vehicles, it may be applied to all kinds of wheels mounted revolubly on shafts of machinery.

When applied to the bearings of a vehicle, as shown, I guard against longitudinal displacement of the rollers *c c* by providing the inner end of the journal B with a fixed shoulder *e* and forming the outer end of the journal with a circumferentially-reduced portion, upon which is seated a collar *h*, held in place by a nut *n*, applied to a screw-threaded end portion *n'*, as shown in Fig. 1 of the drawings.

The shoulder *e* and collar *h*, abutting against opposite ends of the rollers *c c*, confines the latter longitudinally.

My invention differs materially from the ordinary gear-toothed antifriction-rollers in respect to construction and operation and at the same time possesses important advantages over said prior rollers. The comparatively-broad and rounded grooves $C''$ $C''$ of the rollers, with the correspondingly-shaped broad ribs *b'* and *a''*, respectively, on the axle and box, form strong and durable bearings for supporting the weight of the vehicle with load carried thereon, and during the travel of the vehicle the weight is transmitted to the successive broad bearings by sliding thereon and then tilting on the sharp intervening V- shaped bearings, which latter action tends to accelerate the movement of the wheel. Such a result is not obtained by the prior toothed rollers which have the teeth and intervening interstices or recesses of equal size and shape.

What I claim as my invention is—

The improved antifriction bearing consisting of the rollers —$c$—$c$— formed with longitudinal grooves —$c''$— of segmental shape in cross-section and meeting with intervening —V— shaped ridges —$c'$— in combination with the axle and journal-box, each formed with longitudinal ribs of segmental shape in cross-section, and with intervening —V— shaped grooves, corresponding respectively to the grooves and ridges of the rollers, whereby said rollers receive substantial sliding bearings with a minimum degree of friction and are caused to rock on —V— shaped bearings in traversing the successive broader rounded bearings substantially as described and shown.

In testimony whereof I have hereunto signed my name this 13th day of February, 1895.

JAMES B. HANLON. [L. S.]

Witnesses:
HADLEY JONES,
D. E. HANLON.